Patented Oct. 8, 1935

2,016,335

UNITED STATES PATENT OFFICE 2,016,335

MANUFACTURE OF CRUDE RUBBER

John McGavack, Leonia, N. J., assignor, by mesne assignments, to General Rubber Company, New York, N. Y., a corporation of New Jersey No Drawing. Application October 3, 1931, Serial No. 566,801

12 Claims. (Cl. 18—50)

This invention relates to the manufacture of new rubber products from latex and particularly from such as that known as *Hevea brasiliensis*.

This case is a continuation in part of case Serial No. 495,303, filed Nov. 12, 1930.

Crude rubbers have been generally obtained by coagulating whole or concentrated latices with acids or otherwise, or by drying the latex by spray drying or otherwise, and recovering the crude rubber. These rubbers have been used for the manufacture of various rubber goods. The physical properties of these rubbers, and the properties imparted to the vulcanized rubber goods containing such rubbers, have been capable of certain variations, the extent of such variations being limited by the fixed natural content of non-rubber constituents present in the latex. In no instance can these rubbers contain more than the naturally-occurring proportions of the non-rubber constituents of the latex. In the case of the usual acid-coagulation processes, the resulting rubbers contain less than the total protein content of the original latex, and only minor proportions of the other water-solubles present in the latex. Furthermore, the proteins contained in such coagulated rubbers have themselves been coagulated, and hence have been denatured.

It has been proposed to evaporate all of the water from latex by spray-drying, the products of such a process being the so-called whole-latex rubbers, containing all of the non-rubber constituents of the latex in their natural fixed proportions relative to the caoutchouc content. Another proposal has been to separate latex into two layers by creaming or centrifuging and to recover a crude rubber from the heavier layer or serum by acid coagulation. Such a crude rubber contains coagulated, and hence denatured, proteins in higher proportions than does an ordinary rubber obtained from the same original latex by the usual processes of coagulation, while the content of water-solubles remains substantially unchanged. Such crude rubbers are known to be inferior for commercial purposes. It has also been proposed to mix with ordinary rubber the evaporation residue of the serum resulting from the coagulation of rubber latex. Such serum, and the evaporation residue therefrom, are high in water-solubles, both organic and inorganic, but are very low in proteins, containing only a small amount of residual uncoagulable albumens.

An object of this invention is to provide a method of controllably increasing the content of the non-rubber latex solids in crude rubber by controlling the ratio of non-rubber latex solids to the caoutchouc content of a given portion of latex that is to be evaporated. Another object is to produce rubber products, having highly desirable physical properties such as high tensile, non-tearing, and high resistance to ageing, from crude rubber regulated in content as to its non-rubber latex solids. Other objects will be apparent from the following detailed description.

The invention broadly comprises separating latex preserved in any suitable manner against coagulation, into an upper layer containing a percentage of rubber greater than that originally present and a lower layer containing a sub-original percentage of rubber and then recovering the lower layer and evaporating it, as by spray drying, to form a crude rubber. The separation into two layers may be carried out by a creaming operation with any of the known creaming agents such as alginates, pectin, pectin bodies, Irish moss, Karaya gum or similar substances,—or by a centrifuging process in which case creaming agents may or may not be used to assist the separation. In the creaming process, the ratio of rubber to non-rubber solids in the lower layer will depend on the amount of creaming agent used and the time allowed for creaming. This can be regulated as desired. In the centrifuging process the ratio desired may be regulated by varying the size of the opening for the heavy and less heavy liquids as they exit from the machine or by varying the rate of flow through the machine or both.

The creaming process is preferred as it is subject to less varying influences. Where only a very small amount of creaming agent is employed the composition of the lower layer is very similar to the composition of the upper layer. However, as the amount of creaming agent is increased the difference between the two layers becomes very marked; in fact the ratio of rubber to non-rubber in the lower layer becomes gradually smaller and by repeatedly increasing the amount of creaming agent the ratio will approach zero, while the proportions of the various non-rubber solids relative to each other remain substantially unchanged. This enables one to obtain a composition of matter which has any desired ratio of the non-rubber constituents found in latex to rubber. The next step is to obtain in a solid state the entire solids content of the lower layer by evaporation. This may be done by spray drying, or by any other method of drying which is adapted to give complete recover of the solids content of the liquid. The composition of matter obtained by this process is a crude rubber in which the ratio of total non-rubber constituents to rubber may have any desired value greater than that in the original latex, and in which the proportions of all of the solid non-rubber constituents relative to each other are substantially the same as in the original latex. Because of the absence of any strongly acid or alkaline conditions and of any prolonged heat treatment in any stage of the entire process, the product is further characterized in that the proteins contained therein are present in an undenatured state. To this fact are due in large measure the valuable physical properties of the product and of the vulcanized rubber goods made therefrom.

Rubbers obtained by this method have certain peculiar advantages. Among these is a cured rubber which has the same tensile as a first grade rubber but has a considerably reduced stretch. Another one of the advantages is due to the faster curing powers of such a rubber. A further advantage of this rubber due to the high content of undenatured proteins, manifests itself in non-tearing properties, making it useful for inner tube construction, footwear, and such similar products. Rubber shoe tops made of such a rubber are particularly resistant to tearing when the shoe is pulled on, and the heel pieces are made more rigid in construction by employing such a rubber. The new rubber is also found to be particularly resistant to rubber solvents, and such a rubber is useful in the manufacture of hose, gloves, etc. for handling various solvents.

By this invention the resulting crude rubber can be made to contain from about 12% to 80% by weight of the non-rubber latex solids in substantially the same proportions relative to each other in which they occur in the latex, and correspondingly from about 88% to 20% of rubber as caoutchouc.

The following examples are illustrative of the invention but are not to be construed as limiting thereof.

*Example 1.*—To 1000 lbs. of ammonia preserved latex having a total solids concentration of 36%, 50 lbs. of a 1% ammonium alginate solution are added. The mixture is allowed to stand for 24 to 48 hours. A separation into two layers occurs. The lower layer is separated and moisture removed by spray drying.

The composition of the crude rubber thus obtained is shown in the following table, together with that of the original latex from which it was derived and that of the usual whole-latex rubber derived therefrom:

|  | New crude rubber | Ordinary whole-latex rubber | Original latex |
|---|---|---|---|
|  | *Percent* | *Percent* | *Percent* |
| Caoutchouc | 55 | 89 | 32 |
| Ash | 5.1 | 1.2 | 0.43 |
| Proteins | 12.2 | 3.0 | 1.1 |
| Quebrachitol | 12.0 | 3.0 | 1.1 |
| Fatty acids | 13.3 | 3.2 | 1.2 |
| Miscellaneous | 2.4 | 0.6 | .02 |
|  | 100.0 | 100.0 | 36.0 |

The composition given for the original latex is typical of latices from *Hevea brasiliensis*. It is evident that the proportions of the non-rubber constituents in the new rubber relative to each other are substantially equal to those in the original latex. Similar relations hold when other latices of similar composition are employed in the production of crude rubbers by the process of this invention.

The new rubber described in the above example, when vulcanized, showed extremely valuable non-tearing properties, was faster curing, had good tensile, and was more resistant to ordinary rubber solvent. When this rubber was compounded and vulcanized in a first grade tube formula and compared with a similar compound using pale crepe there were obtained the following results:

|  | Pale crepe compound | New rubber compound |
|---|---|---|
|  | *Lbs.* | *Lbs.* |
| Tear resistance | 5 | 25 |
| Tensile after ageing 212° F. in air for 24 hours | 3000 | 3000 |
| Tensile after ageing 8 hrs. at 249° F. at 100% elongation (in air) | 300 | 1200 |
| Permeability | .0016 | .0010 |

Permeability is expressed as ccs. of air (at 40° C. and 1 atmosphere pressure) per hour per sq. in. area per inch thickness per atmosphere head at 40° C.

*Example 2.*—To indicate the properties of finished vulcanized products embodying a series of crude rubbers of this invention having varying proportions of non-rubber latex solids, as compared with a product using instead a well known crude rubber, pale crepe, the following table is given. The formula employed comprises (parts by weight):

|  | Parts |
|---|---|
| Crude rubber | 100 |
| Zinc oxide | 10 |
| Blanc fixe | 17 |
| Lithopone | 12 |
| Mineral wax | 1 |
| Stearic acid | 4 |
| Sulphur | 2 |
| Antioxidant | 1 |
| Accelerator | 1.25 |

| Composition of crude rubber [1] | A | B | C | D | E | F |
|---|---|---|---|---|---|---|
| Percent latex non-rubber constituents | 8 | 25 | 29 | 34 | 38 | 50 |
| Percent rubber as caoutchouc | 92 | 75 | 71 | 66 | 62 | 50 |
| Physical properties of vulcanized product |  |  |  |  |  |  |
| Tear (lbs.) | 5 | 9 | 14 | 16 | 19 | 25 |
| Permeability | .0917 | .0012 | .0011 | .0010 | .0009 | .0006 |
| Tensile (lbs./sq. in.) | 3500 | 4100 | 4000 | 3500 | 3500 | 3200 |
| Tensile after ageing 8 hrs. at 249° F. at 100 percent elongation (in air) | 300 | 900 | 800 | 910 | 970 | 1100 |

[1] The rubber used in A was ordinary pale crepe; in the other mixes were used the new crude rubbers of varying compositions as shown.

This table shows clearly how increasing the ratio of the non-rubber latex solids to rubber over a wide range produces vulcanized products having exceptionally high tear resistance, better ageing and lower permeability.

In addition to these characteristics and results it has also been found that by the addition of fillers to this type of rubber the tear resistance, instead of being decreased, is actually improved; in fact by increasing the volume of filler to three times its original volume the tear resistance has been doubled. This is entirely contrary to results obtained with any known crude rubber now on the market.

Another advantage possessed by this type of rubber is that when it is compounded for example with carbon black in a tread stock, it will give a very hard tread, much harder than any other type of rubber in the same compound has ever been known to give.

It is clear that the invention can be practiced in various forms, for instance any desired ratio of the non-rubber latex-solids to rubber may be obtained in a single composition by the proper blending of various rubbers prepared as indicated herein, or the new rubbers may be added in any proportions to a rubber composition containing ordinary crude rubber to raise the proportion of non-rubber latex-solids therein as desired; for example if one desires a rubber product having the properties of a rubber such as C in the above table, this may be obtained by proper control of the creaming operation or a rubber such as E may be blended in the proper proportions with a normal rubber or other rubber containing a lesser proportion of non-rubber latex solids.

It is to be understood that while latex from *Hevea brasiliensis* has been used for the purpose of illustrating the invention, latices containing proportions of solid non-rubber constituents approximately similar to those of *Hevea brasiliensis*, are to be considered as equivalents of *Hevea brasiliensis* within the scope of the appended claims.

Having thus described my invention, what I claim and desire to protect by Letters Patent is:

1. A vulcanized inner tube resulting from the vulcanization of a rubber mix containing a crude rubber derived from *Hevea brasiliensis* latex, said crude rubber consisting of from about 12% to about 50% of the non-rubber latex-solids and from about 88% to about 50% caoutchouc, said tube having a tearing strength greater than 5 lbs. and a permeability to air less than .0017.

2. A vulcanized inner tube resulting from the vulcanization of a rubber mix containing a crude rubber derived from *Hevea brasiliensis* latex, said crude rubber consisting of from about 12% to about 50% of the non-rubber latex-solids and from about 88% to about 50% caoutchouc, the proportions of said non-rubber solids relative to each other being substantially equal to those characteristic of the normal latex, said tube having a tearing strength greater than 5 lbs. and a permeability to air less than .0017.

3. A vulcanized inner tube resulting from the vulcanization of a rubber mix containing a crude rubber derived from *Hevea brasiliensis* latex, said crude rubber consisting of from about 25% to about 50% of the non-rubber latex solids and from about 75% to about 50% caoutchouc, said tube having a tearing strength of from about 9 to 25 lbs. and a permeability to air of from about .0012 to .0006.

4. A process of forming crude rubber from latex preserved against coagulation which comprises effecting the separation of latex into two portions of different densities in the presence of a chemical creaming agent, recovering the denser of said portions, said denser portion being relatively poor in rubber content, and removing water from said denser portion.

5. A process as described in claim 4 wherein the water is removed by spray drying the denser portion in such a manner that the proteins are prevented from being denatured.

6. A rubber composition of improved durability embodying a mixture of ordinary rubber and the evaporation residue of a rubber-containing latex-serum which residue is characterized in that it contains substantially all the latex-nonrubber solid constituents in an amount at least equal to one-third of the weight of the caoutchouc of the residue.

7. A rubber composition of improved durability embodying a mixture of ordinary rubber and the evaporation residue of a rubber-containing latex-serum which residue is characterized in that it contains substantially all the latex-nonrubber solid constituents in an amount substantially equal to the weight of the caoutchouc of the residue.

8. A process of producing vulcanized rubber goods of improved durability which comprises vulcanizing a rubber mix containing ordinary rubber compounded with the evaporation residue of a rubber-containing latex-serum which residue is characterized in that it contains substantially all the latex-nonrubber solid constituents in an amount at least equal to one-third of the weight of the caoutchouc of the residue.

9. A process of producing vulcanized rubber goods of improved durability which comprises vulcanizing a rubber mix containing ordinary rubber compounded with the evaporation residue of a rubber-containing latex-serum which residue is characterized in that it contains substantially all the latex-nonrubber solid constituents in an amount substantially equal to the weight of the caoutchouc of the residue.

10. A vulcanized rubber product of improved durability resulting from the process set forth in claim 8.

11. A vulcanized rubber product of improved durability resulting from the process set forth in claim 9.

12. As a new product a rubber-containing latex-serum evaporation residue characterized in that it contains substantially all the latex-nonrubber solid constituents in an amount at least equal to about one-half of the weight of the caoutchouc of the residue.

JOHN McGAVACK.